(No Model.)
R. P. BARNSTEAD.
COUPLING FOR FAUCETS.
No. 289,601. Patented Dec. 4, 1883.
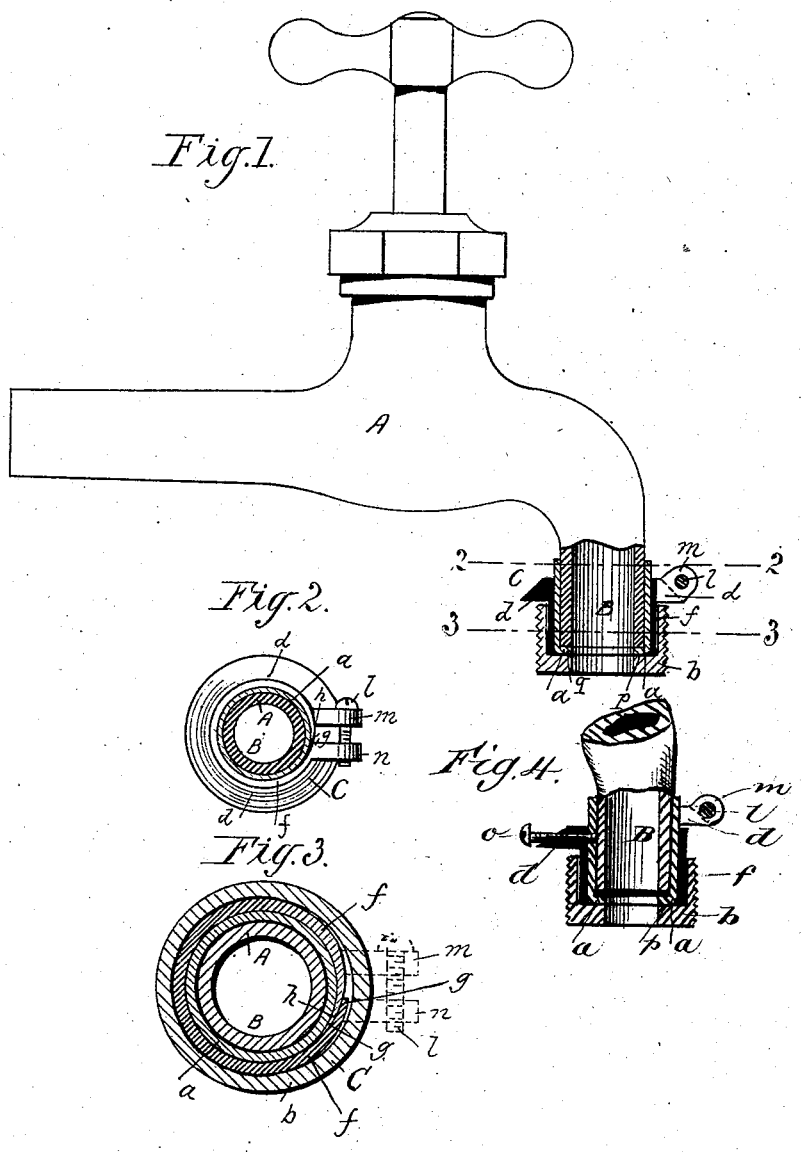
Witnesses —
Wm. S. Bellows
Geo. W. M. Given
Rob't P. Barnstead,
Inventor —
By Brown Bros.
Attorneys.

UNITED STATES PATENT OFFICE.

ROBERT P. BARNSTEAD, OF BOSTON, MASSACHUSETTS.

COUPLING FOR FAUCETS.

SPECIFICATION forming part of Letters Patent No. 289,601, dated December 4, 1883.

Application filed July 30, 1883. (No model.)

*To all whom it may concern:*

Be it known that I, ROBERT P. BARNSTEAD, of Boston, in the county of Suffolk and State of Massachusetts, have invented certain new and useful Improvements in Couplings for Faucets, of which the following is a full, clear, and exact description.

This invention relates to a coupling for nozzles of bib and other faucets, to adapt them for the attachment of filters and hose.

This improved coupling is composed of a hollow nipple exteriorly screw-threaded, and of a split collar or ring, which is at one end of said nipple, and is attached to a split thimble secured to said nipple, in combination with tightening and loosening mechanism to operate upon said collar, all so that said coupling, if to be attached to a faucet-nozzle, can be tightly closed about the same, and if to be removed, loosened therefrom, according as may be desired, preferably suitable packing material being used at the joint between the faucet and coupling aforesaid to prevent leakage of water or other liquid, all substantially as hereinafter described.

In the accompanying plate of drawings, Figure 1 is a side elevation. Figs. 2 and 3 are cross-sections on lines 2 2 and 3 3, respectively, Fig. 1. Fig. 4 is a detail sectional view similar to Fig. 1, to be hereinafter referred to.

In the drawings, A represents a bib faucet or cock of the ordinary construction, and B is its nozzle. The nozzle B is surrounded by packing $a$, made of india-rubber or other suitable compressible and preferably elastic material, and shaped to closely fit the sides and end of said nozzle, as shown.

C is the attachable and detachable coupling of this invention. This coupling C is composed of a nipple, $b$, exteriorly screw-threaded, and of a split collar or ring or flange, $d$. The split collar $d$ is made separate from the nipple, and interiorly it is attached by soldering or otherwise to one end of a split thimble, $f$, which is made of thin or springy sheet metal, and of a shape to conform to the interior of the collar, and its ends $g$ to overlap at the split $h$ of the collar. The split of the collar and spring and overlap of the ends of the split thimble are all such as to permit the collar and thimble to be closed about and against the nozzle of the faucet, or, rather, the packing $a$ thereon, and thus secure their attachment to said nozzle, and for the collar and thimble to open out from the nozzle and packing, to permit of their being removed therefrom. The closing of the collar and thimble about and the loosening of the same from the faucet-nozzle, as has been above described, is secured, as shown, by turning the screw $l$ in the proper direction, this screw passing loosely through one and screwing into the other of the earpieces $m$ $n$ at both sides of the split of the collar. The thimble $f$ enters the nipple $b$, and it is attached to its inner wall by solder or other suitable means in a manner to allow it to be closed upon and to open from the faucet-nozzle, as has been above described, and thus, as is obvious, by the attachment of the collar and thimble to the nozzle of the faucet, the screw-nipple is fastened thereto, rendering the faucet suitable for a filter and hose, to be secured or coupled thereon. Detaching the collar and thimble detaches the screw-nipple, as is evident. If the thimble is attached by soldering it, as has been indicated, to allow the movement of the thimble above explained, the soldering should be for about two-thirds of the circumference of the thimble and opposite to its split, and about one-third of its height from its lower end. If desired, as shown in Fig. 4, a set-screw, $o$, may be used to secure the collar after its attachment, as stated, to the faucet-nozzle, in its said position of attachment thus relieving its holding-screw $l$ of strain, as also making the attachment more secure and rigid. The nipple preferably is interiorly shouldered, as at $p$, to make, when it is applied to the faucet-nozzle, a seat against the packing at its end $q$. The screw-nipple, attached and packed as described, plainly makes a tight connection with the faucet-nozzle, and if the attachment to said nipple of the filter or hose is suitably packed no leakage of water can occur. A packing between the faucet-nozzle and screw-nipple and the overlapping of the ends of the split thimble $f$ are both preferable for obvious reasons, although either may be dispensed with; but in such case it might be difficult to obtain a tight joint between the collar and thimble carrying the nipple and the faucet-nozzle.

Having thus described my invention, what I claim is—

1. A coupling for attachment to and detachment from a faucet-nozzle, composed of a screw-threaded nipple, *b*, a split collar, *d*, and a split thimble, *f*, applied together and combined with tightening and loosening mechanism, substantially as described, for the purpose specified.

2. A coupling for attachment to and detachment from a faucet-nozzle, composed of a screw-threaded nipple, *b*, a split collar, *d*, and a split and overlapping thimble, *f*, applied together and combined with tightening and loosening mechanism, substantially as described, for the purpose specified.

3. A coupling for attachment to and detachment from a faucet-nozzle, composed of a screw-threaded nipple, *b*, a split collar, *d*, and a split thimble, *f*, applied together and combined with tightening and loosening mechanism and packing *a*, substantially as described, for the purpose specified.

4. A coupling for attachment to and detachment from a faucet-nozzle, composed of a screw-threaded nozzle, B, a split collar having ear-pieces *m n* and screw *l*, and a split thimble, *f*, applied together substantially as described, for the purpose specified.

In testimony whereof I have hereunto set my hand in the presence of two subscribing witnesses.

R. P. BARNSTEAD.

Witnesses:
   EDWIN W. BROWN,
   WM. S. BELLOWS.